United States Patent
An et al.

(10) Patent No.: US 9,738,189 B2
(45) Date of Patent: Aug. 22, 2017

(54) ELECTRIC HEADREST

(71) Applicant: HYUNDAI DYMOS INCORPORATED, Seosan-si, Chungcheongnam-do (KR)

(72) Inventors: Sung Chol An, Hwaseong-si (KR); Jin Ho Seo, Yongin-si (KR); Chan Uk Park, Gyeongju-si (KR); Myeong Sub Kim, Seongnam-si (KR); Yun Ho Kim, Osan-si (KR); Dong Hwan Kim, Hwaseong-si (KR)

(73) Assignee: HYUNDAI DYMOS INCORPORATED, Seosan-si, Chungcheongnam-Do (KR)

( * ) Notice: Subject to any disclaimer, the term of this patent is extended or adjusted under 35 U.S.C. 154(b) by 0 days.

(21) Appl. No.: 15/304,362

(22) PCT Filed: May 8, 2015

(86) PCT No.: PCT/KR2015/004589
§ 371 (c)(1),
(2) Date: Oct. 14, 2016

(87) PCT Pub. No.: WO2015/170908
PCT Pub. Date: Nov. 12, 2015

(65) Prior Publication Data
US 2017/0043691 A1  Feb. 16, 2017

(30) Foreign Application Priority Data
May 8, 2014 (KR) .......... 10-2014-0054847

(51) Int. Cl.
*B60N 2/48* (2006.01)
*A47C 7/38* (2006.01)

(52) U.S. Cl.
CPC ............ *B60N 2/4805* (2013.01); *A47C 7/38* (2013.01); *B60N 2/48* (2013.01); *B60N 2002/4888* (2013.01)

(58) Field of Classification Search
CPC ...... B60N 2/4805; B60N 2/48; B60N 2/4885; B60N 2/4838; B60N 2/4228; B60N 2002/4888; A47C 7/38
(Continued)

(56) References Cited

U.S. PATENT DOCUMENTS

| | | | |
|---|---|---|---|
| 6,513,871 B2 * | 2/2003 | Bartels ............. | B60N 2/4808 |
| | | | 297/216.12 |
| 9,315,127 B2 * | 4/2016 | Okimura ............. | B60N 2/4228 |

(Continued)

FOREIGN PATENT DOCUMENTS

| | | |
|---|---|---|
| JP | 2007-118775 A | 5/2007 |
| KR | 20-1998-0037917 U | 9/1998 |

(Continued)

OTHER PUBLICATIONS

International Search Report, PCT/KR2015/004589, filed May 8, 2015, search mailed on Jul. 6, 2015, 4pp.

*Primary Examiner* — Milton Nelson, Jr.
(74) *Attorney, Agent, or Firm* — Brinks Gilson & Lione

(57) ABSTRACT

The present disclosure provides an electric headrest including: an oil damper which has a storing part in which oil is stored, and a rotary shaft coupled to the top of the storing part and having a first saw-toothed part protruding from the outer peripheral surface of the rotary shaft; a center cover that is formed in the center of the rear of a headrest pad and in which the oil damper is coupled to the inside of a hinge coupling part; and a side cover coupled to the center cover at the side of the center cover by the hinge coupling part, and (Continued)

having a second saw-toothed part formed at a position corresponding to the first saw-toothed part of the oil damper.

6 Claims, 4 Drawing Sheets

(58) Field of Classification Search
USPC .............................................. 297/216.12, 391
See application file for complete search history.

(56) References Cited

U.S. PATENT DOCUMENTS

| 2003/0151279 A1* | 8/2003 | Fowler | B60N 2/4235 |
| | | | 297/216.12 |
| 2010/0164262 A1* | 7/2010 | Okimura | F16F 9/14 |
| | | | 297/216.12 |
| 2012/0086255 A1* | 4/2012 | Ishimoto | B60N 2/4228 |
| | | | 297/406 |

FOREIGN PATENT DOCUMENTS

| KR | 10-2007-0031490 A | 3/2007 |
| KR | 10-0775371 B | 11/2007 |
| KR | 10-2011-0002542 A | 1/2011 |

* cited by examiner

[Fig.1]
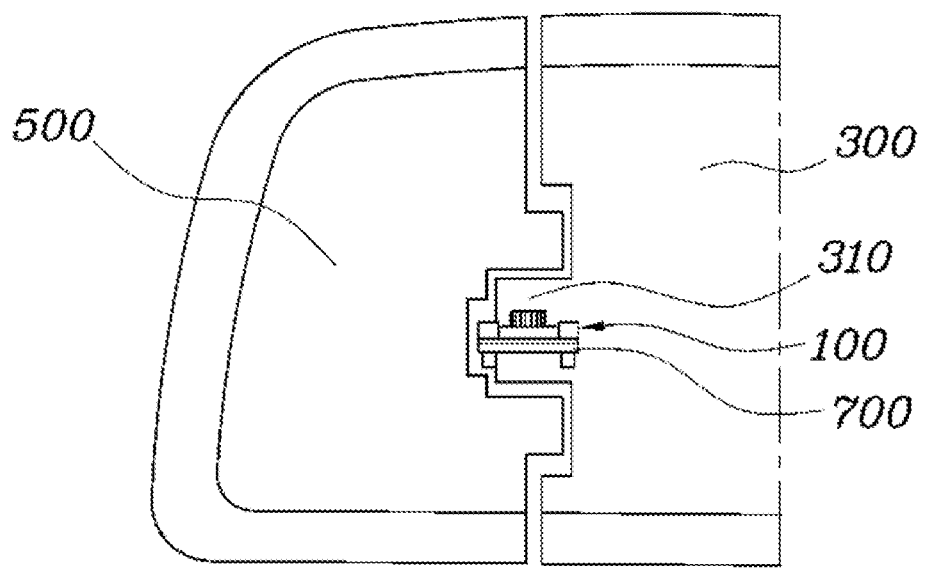

[Fig.2]
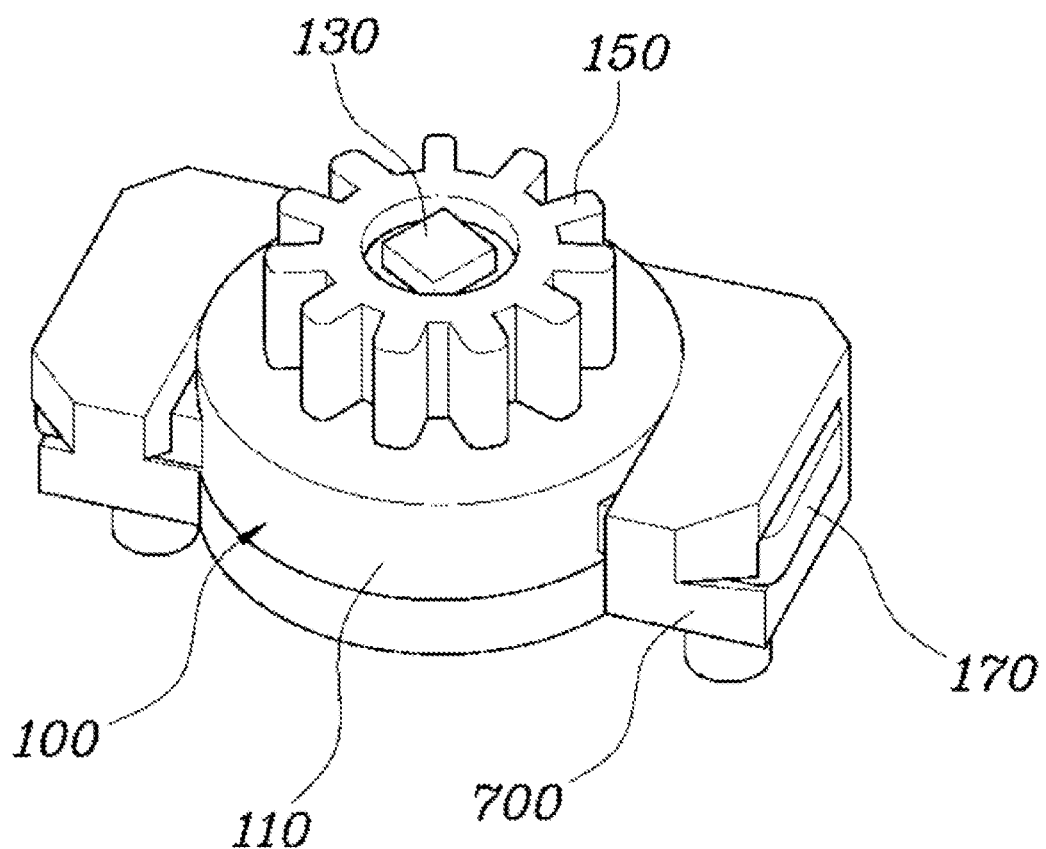

[Fig.3]
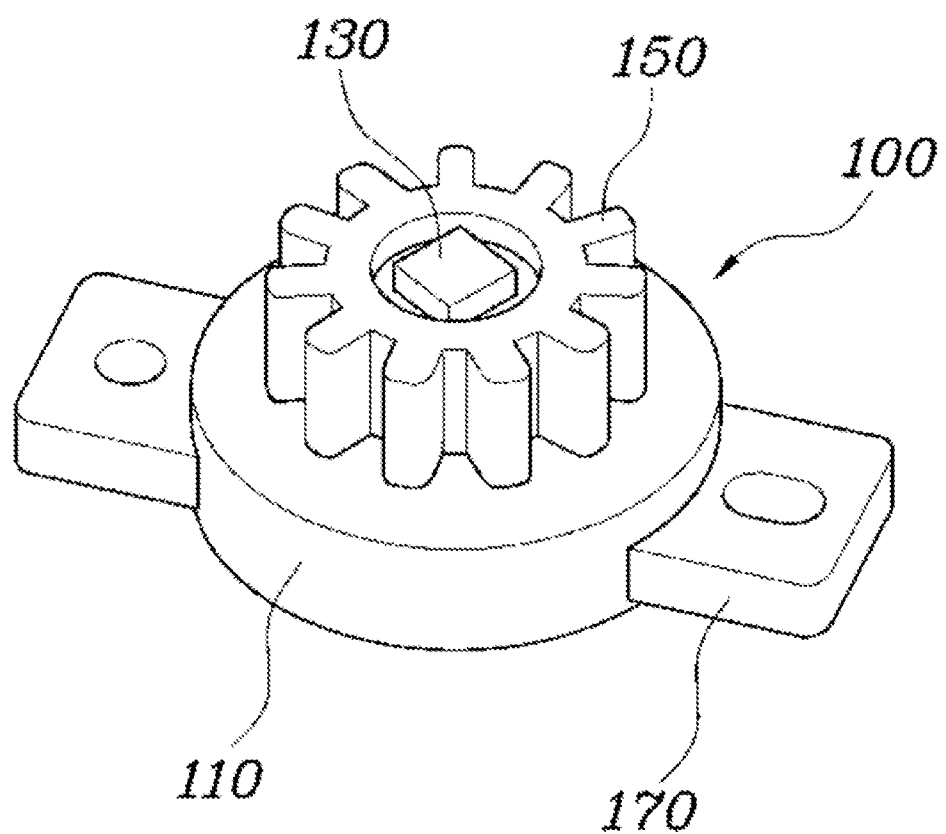

[Fig.4]
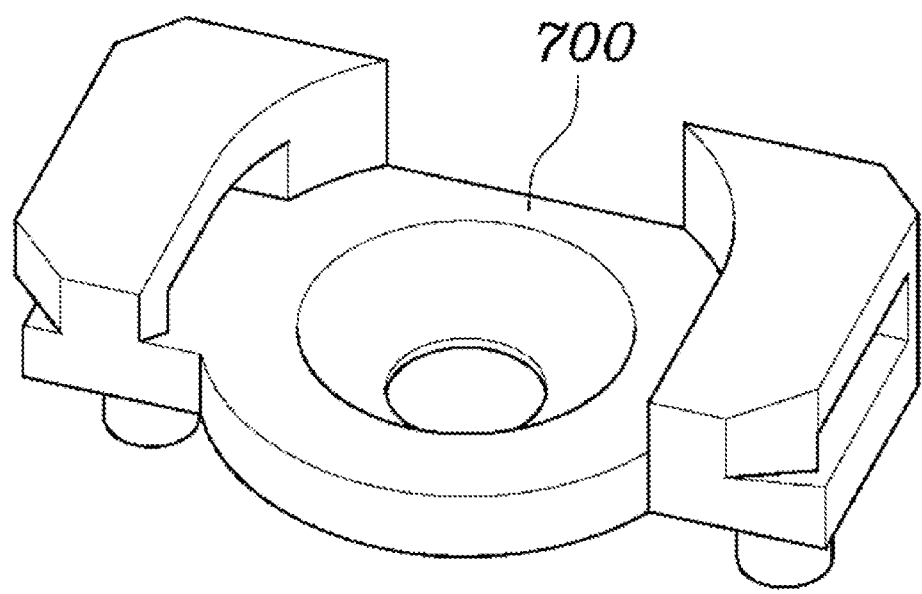

ELECTRIC HEADREST

CROSS-REFERENCE TO RELATED APPLICATIONS

This application is a filing under 35 U.S.C. §371 of International Patent Application PCT/KR2015/004589, filed May 8, 2015, and claims the priority to KR 10-2014-0054847, filed May 8, 2014. These applications are incorporated by reference herein in their entirety.

FIELD

The present disclosure relates to an electric headrest that is provided on an upper portion of a seat to support a passenger's head, and is improved to more comfortably and easily surround and support a passenger's head as required.

BACKGROUND

A headrest for a vehicle protects a user's neck or head from injury due to the tilting of his or her neck in the event of a car crash, and enables the head to come into close contact therewith under normal driving conditions, thus enabling the user to keep a comfortable posture. Such a headrest is mounted on an upper end of a seat back to support a passenger's head and neck, and is composed of a pad made of a cushion material and a headrest pole connected to a seat frame. The headrest pole is connected to the seat frame to be movable up and down, so that a height of the headrest pole is adjusted to fit a passenger's height.

Conventionally, the wings of a winged headrest for surrounding the head comfortably and easily as well as the height of the headrest are important. To this end, Korean Patent No. 10-0775371 B1 discloses an apparatus for adjusting a position of a headrest. The apparatus includes: left and right support parts that are provided on both sides of an upper end of a seat to be spaced apart from each other; a headrest that is interposed between the left and right support parts to support the head, and is movable back and forth; left and right fixing guide members that are installed in the left and right support parts such that surfaces of the members are exposed; an elastic plate spring that is installed in the headrest to be curved while having an elastic force, and is fixed at both ends thereof to the left and right fixing guide members; a through hole that accommodates the elastic plate spring and is formed across the headrest to define a space for changing a direction of the curved shape of the elastic plate spring; and a fixing hinge pin that is provided in a central portion of the elastic plate spring to protrude vertically and is fixedly embedded in the headrest.

However, the conventional headrest is operated with respect to a hinge and is configured such that the wings on both ends of the headrest are fixed to adjusted positions by friction between the fixing part and an actuating part. Since there is no device for fixing the wings after they are operated, a user should exert much power to adjust the headrest when a frictional force is too large, and the headrest may return to its original position by a head support weight when the frictional force between the fixing part and the actuating part is too small. However, it is difficult to standardize and apply a proper actuating force (frictional force) because it is very different from individual to individual.

The foregoing is intended merely to aid in the understanding of the background of the present disclosure, and is not intended to mean that the present disclosure falls within the purview of the related art that is already known to those skilled in the art.

SUMMARY

Accordingly, the present disclosure provides an electric headrest, in which a headrest wing is actuated to make a passenger to feel comfortable, and then an actuating force is easily varied depending on an intended user.

In an aspect, the present disclosure provides an electric headrest including: a center cover provided on a headrest pad and having on a side thereof a hinge coupling part; an oil damper coupled to an inside of the hinge coupling part of the center cover, the oil damper comprising: a storing part configured to store oil therein, and a rotary shaft coupled to a top of the storing part and having a first saw-toothed part protruding from an outer peripheral surface of the rotary shaft; and a side cover coupled to the center cover at the side of the center cover by the hinge coupling part, and having a second saw-toothed part formed at a position corresponding to the first saw-toothed part of the oil damper.

The storing part may have a disc shape with a predetermined height, and fixing parts protrude from both sides of the storing part.

A fan may be coupled to an end of the rotary shaft in the storing part, and the fan may be rotated by the rotary shaft as the hinge coupling part rotates.

The oil damper may be coupled to and supported by a guide that may be separately formed.

The rotary shaft of the oil damper may be rotatably coupled with the hinge coupling part.

The second saw-toothed part may be vertically formed on an inside of the hinge coupling part of the side cover.

According to the electric headrest configured as described above, an oil damper is added to the hinge coupling part between the center cover and the side cover, thus making it easy to tune the wing adjustment actuating force, and allowing the wing adjustment actuating force to be realized according to a user's needs. Consequently, it is possible to enhance a user's satisfaction and to achieve a rebranding effect.

DRAWINGS

FIG. 1 is a view illustrating an electric headrest according to one form of the present disclosure;

FIG. 2 is a view illustrating a state in which an oil damper is coupled with a guide;

FIG. 3 is a view illustrating the oil damper; and

FIG. 4 is a view illustrating the guide.

DETAILED DESCRIPTION

Hereinafter, an electric headrest according to one form of the present disclosure will be described with reference to the accompanying drawings.

FIG. 1 is a view illustrating an electric headrest according to one form of the present disclosure, and FIGS. 2 to 4 are detailed views illustrating an oil damper 100 and a guide 700.

Generally, a seat for a vehicle is configured such that a headrest pad is coupled to a seat back by a stay rod such that it can be vertically adjusted in height. The headrest pad is supported by a center cover provided on a center of a rear surface thereof and side covers coupled to both sides of the center cover. Particularly, in the case of a winged headrest, the side cover moves back and forth around a hinge coupling part that is coupled with the center cover by a driving part, such as a motor, thus allowing the side cover to be adjusted for a user's convenience.

Conventionally, since the wing adjustment actuating force is determined depending on the height and the number of teeth formed on the upper and lower portions of a hinge pin of the hinge coupling part, the actuating force cannot adjusted to match a user's preference, thus causing inconvenience to him or her due to an improper level of actuating force.

Therefore, the electric headrest according to one form of the present disclosure includes: an oil damper 100 having a storing part 110 that stores oil therein, and a rotary shaft 130 that is coupled to a top of the storing part 110 and has a first saw-toothed part 150 formed to protrude from the outer peripheral surface of the rotary shaft; a center cover 300 that is formed on the center of the rear of the headrest pad (not shown) and in which the oil damper 100 is coupled to the inside of a hinge coupling part 310; and a side cover 500 that is coupled to the center cover 300 at the side of the center cover 300 by the hinge coupling part 310, and has a second saw-toothed part (not shown) formed at a position corresponding to the first saw-toothed part 150 of the oil damper 100.

The center cover 300 and the side cover 500 are coupled to each other by the hinge coupling part 310, so that the side cover 500 is moved back and forth by an actuating part (not shown) when a wing adjustment function is performed. The oil damper 100 is coupled to the inside of the hinge coupling part 310 of the center cover 300, so that the second saw-toothed part in the hinge coupling part 310 engages with the first saw-toothed part 150 of the oil damper 100, thus leading to operation thereof.

In order to couple the center cover 300 with the side cover 500, the hinge coupling part 310 is provided. As illustrated in FIG. 1, the hinge coupling part 310 is formed into a pipe shape, thus allowing the oil damper to be coupled therein. Alternatively, the hinge coupling part may be made by a hinge shaft (not shown). One form in which the oil damper 100 is formed on the hinge coupling part 310 of the center cover 300 will be illustrated and described by way of example.

The storing part 110 of the oil damper 100 may have a disc shape with a predetermined height, and fixing parts 170 may be formed to protrude from both sides of the storing part. However, without being limited to the above-described shape, the shape may be variously changed depending on a design and an environment. A fan (not shown) is coupled to an end of the rotary shaft 130 in the storing part 110, so that the rotary shaft 130 is rotated as the hinge coupling part or the hinge shaft rotates, and thereby the fan is rotated. When the fan is rotated, it is subject to resistance of the oil stored in the storing part 110. Thus, it is possible to freely design the wing adjustment actuating force depending on the viscosity of the oil stored in the storing part 110, thus providing an actuating force as needed and consequently enhancing satisfaction.

A guide 700 that is separately formed is coupled to an outside of the oil damper 100, and the fixing part 170 of the oil damper 100 is fitted into the guide 700 to be supported, thus allowing the oil damper 100 to be more firmly coupled to the hinge coupling part 310, in addition to protecting the storing part 110.

Therefore, the above-described electric headrest is configured such that the oil damper is added to the hinge coupling part between the center cover and the side cover, thus making it easy to tune the wing adjustment actuating force, and allowing the wing adjustment actuating force to be realized according to a user's needs. Consequently, it is possible to enhance a user's satisfaction and to achieve a rebranding effect.

Although the forms of the present invention have been disclosed for illustrative purposes, those skilled in the art will appreciate that various modifications, additions and substitutions are possible, without departing from the scope and spirit of the present disclosure.

The invention claimed is:

1. An electric headrest comprising:
   a center cover provided on a headrest pad and having on a side thereof a hinge coupling part;
   an oil damper coupled to an inside of the hinge coupling part of the center cover, the oil damper comprising:
      a storing part configured to store oil therein, and
      a rotary shaft coupled to a top of the storing part and having a first saw-toothed part protruding from an outer peripheral surface of the rotary shaft; and
   a side cover coupled to the center cover at the side of the center cover by the hinge coupling part, and having a second saw-toothed part formed at a position corresponding to the first saw-toothed part of the oil damper.

2. The electric headrest according to claim 1, wherein the storing part has a disc shape with a predetermined height, and fixing parts protrude from both sides of the storing part.

3. The electric headrest according to claim 1, wherein a fan is coupled to an end of the rotary shaft in the storing part, and the fan is rotated by the rotary shaft as the hinge coupling part rotates.

4. The electric headrest according to claim 1, wherein the oil damper is coupled to and supported by a guide that is separately formed.

5. The electric headrest according to claim 1, wherein the rotary shaft of the oil damper is rotatably coupled with the hinge coupling part.

6. The electric headrest according to claim 1, wherein the second saw-toothed part is vertically formed on an inside of the hinge coupling part of the side cover.

* * * * *